United States Patent [19]
Dyer

[11] Patent Number: 5,896,737
[45] Date of Patent: Apr. 27, 1999

[54] COMBINED PRESSURE REGULATING AND FUEL FLOW SYSTEM

[75] Inventor: Gerald P. Dyer, Enfield, Conn.

[73] Assignee: United Technologies Corporation, Windsor Locks, Conn.

[21] Appl. No.: 08/876,900

[22] Filed: Jun. 16, 1997

[51] Int. Cl.[6] .................................................... F02C 9/26
[52] U.S. Cl. ...................................... 60/39.03; 60/39.281
[58] Field of Search ............................ 60/39.03, 39.281, 60/734

[56] References Cited

U.S. PATENT DOCUMENTS

| | | | |
|---|---|---|---|
| 2,770,945 | 11/1956 | Crim | 60/734 |
| 3,334,705 | 8/1967 | Lam | 180/79.2 |
| 4,057,073 | 11/1977 | Adams | 137/118 |
| 4,541,451 | 9/1985 | Wittren et al. | 137/118 |
| 4,760,696 | 8/1988 | Rooks et al. | 60/39.281 |
| 4,910,956 | 3/1990 | Legore et al. | 60/39.281 |
| 5,116,362 | 5/1992 | Arline et al. | 60/734 |
| 5,235,806 | 8/1993 | Pickard | 60/39.281 |
| 5,339,636 | 8/1994 | Donnelly et al. | 60/734 |
| 5,709,079 | 1/1998 | Smith | 60/39.281 |

Primary Examiner—Louis J. Casaregola

[57] ABSTRACT

A fuel delivery system for providing a desired fuel flow to an engine includes a pump means for providing fuel to a metering valve which in turn regulates the flow of fuel to provide a desired fuel flow to the engine by varying the area of the metering window. The pressure differential across the metering valve is maintained at a desired set point in order to precisely control desired fuel flow by varying the area of the metering window. The pressure differential is sensed by a pressure regulating motive flow control valve (PRMFV). The PRMFV is positioned in response to the pressure differential to bypass fuel away from the metering valve to control the differential pressure to the desired set point. The PRMFV first bypasses fuel to an ejector pump and as the amount of excess flow to the metering valve increases the PRMFV bypasses fuel back to the inlet of the pump means.

19 Claims, 4 Drawing Sheets

COMBINED PRESSURE REGULATING AND FUEL FLOW SYSTEM

TECHNICAL FIELD

This invention relates to fuel delivery systems and more particularly to fuel delivery systems for aircraft gas turbine systems.

BACKGROUND ART

It is well known in the art of fuel delivery systems for aircraft gas turbine engines to use a positive displacement pump, such as a vane or gear pump, to pressurize fuel prior to its metering and subsequent delivery to the engine. Positive displacement pumps provide a flow whose volume is a function of the speed at which the pump is rotating. This characteristic makes it impossible to provide metered flow to the engine solely by controlling the area of a metering valve when the pump is driven by the engine. Therefore a pressure regulating valve (PRV) and a flow bypass system are used to facilitate the delivery of an accurately measured fuel flow to the engine.

The positive displacement pump is sized to ensure an excess flow capacity at all possible operating conditions. The pressurized fuel is then typically input to the PRV which operates to provide a fixed pressure drop across a metering valve controlled by an electronic engine control (EEC). Operation of the PRV and metering valve together is based upon incompressible flow theory which states that flow through a valve is a function of the area of the valve opening multiplied by the square root of the product of the pressure drop across the valve multiplied by the specific gravity of the fluid. Thus, with the PRV providing a fixed pressure drop across the metering valve, the EEC can control the area of the metering valve to provide the required fuel flow to the engine.

To maintain the fixed pressure drop across the metering valve the PRV uses a fuel bypass system from the outlet of the pump back to the inlet of the pump.

In addition, positive displacement pumps typically require a fluid to be supplied to the inlet of the pump at sufficient pressure to prevent cavitation or starvation of the pump. It is known in the art to use an electric pump at startup or lightoff to provide an initial flow of fuel from the fuel tank, at sufficient pressure to the positive displacement pump.

In order to improve aircraft fuel efficiency, typical fuel delivery systems also use an ejector pump to provide this pressurization of fuel in flight. The ejector pump operates on an excess flow of fuel bypassed by a second valve know as a motive flow valve. Typically the motive flow valve is controlled by the EEC and allows fuel to be bypassed to the ejector pump when the engine has reached a predetermined speed.

However, problems arise in that the motive flow valve is turned on independent of the PRV which is controlling the pressure drop across the metering valve. If the motive flow valve is opened when there is insufficient flow to bypass to the inlet of the positive displacement pump through the PRV the positive displacement pump could be starved causing an interruption in the supply of fuel to the engine. An interruption of 50 ms can be sufficient to cause a flameout.

A separate motive flow valve also complicates the design of the fuel delivery system in that the PRV must be designed to handle transients in the flow of fuel to the metering valve introduced when the motive flow valve is opened.

DISCLOSURE OF INVENTION

An object of the present invention is to eliminate the danger of flameout caused by pump starvation by incorporating the motive flow valve function into the PRV.

It is another object if the invention to eliminate the danger of flameout caused by ejector pump failure by controlling the fuel flow to the ejector based upon pressure drop across the metering valve as opposed to engine speed.

It is a further object of the invention to eliminate transients in fuel flow by incorporating the motive flow bypass into the pressure regulation method of the metering valve.

Another object of the present invention is to improve fuel system efficiency by first bypassing excess fuel to the ejector pump, thus allowing the electric pump to be turned off earlier.

It is a further object of the present invention to simplify the manufacture of fuel delivery systems by eliminating the requirement for a separate motive flow valve.

According to the present invention a fuel delivery system comprises a combined pressure regulating and motive flow control valve (PRMFV). The PRMFV senses the output of the positive displacement pump and the output of the metering valve. The PRMFV controls the pressure differential between these two outputs by bypassing a portion of the excess output from the positive displacement pump.

The PRMFV has three basic modes of operation. Upon engine start or lightoff an electric pump provides pressurized fuel to the positive displacement pump input and the PRMFV is positioned to minimize the pump output from being bypassed. As the engine speed increases, the positive displacement pump provides more flow. The PRMFV is positioned to bypass excess flow to an ejector pump to provide pressurized fuel to the positive displacement pump and the electric pump is turned off. As the engine speed increases further, the positive displacement pump flow increases exceeding the amount of excess flow that can be bypassed to the ejector. At this point the PRMFV is positioned to bypass flow to the ejector pump and to the inlet of the positive displacement pump.

The present invention has the utility of preventing pump starvation by incorporating the motive flow control into the pressure regulator valve thus allowing the bypass to the ejector pump to be integrated into the control methodology to insure there is always sufficient flow at the output of the positive displacement pump. The present invention also has the utility of preventing flameout by basing the control of fuel flow to the ejector upon the pressure differential across the metering valve as opposed to engine speed. The present invention also has the utility of improving fuel system efficiency by allowing the motive flow to the ejector to be provided earlier, allowing the electric pump to be turned off. The present invention also simplifies fuel system design by reducing parts count and by eliminating a transient condition associated with a separate motive flow valve.

BEST MODE FOR CARRYING OUT THE INVENTION

Figure 1:
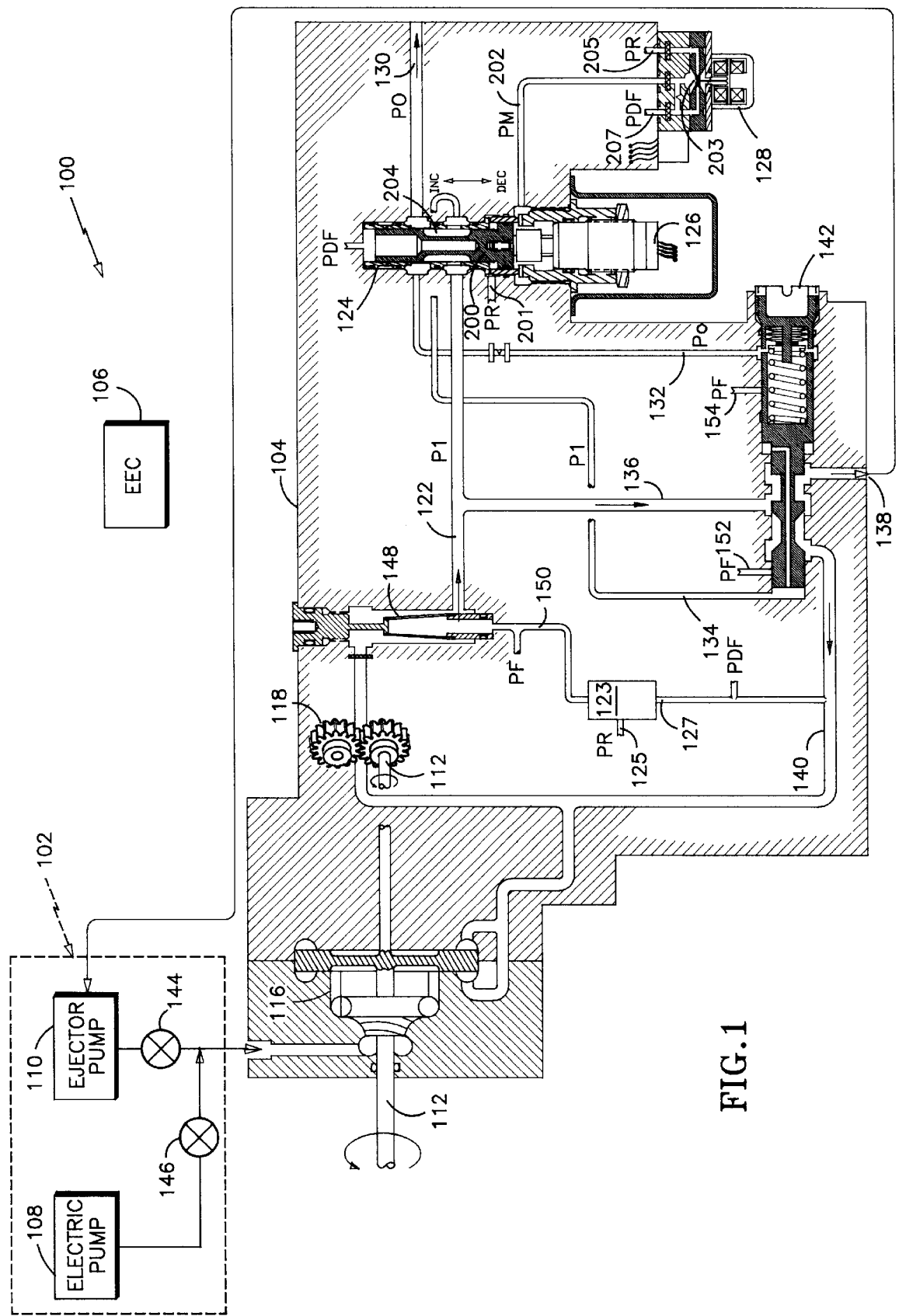
FIG. 1 is a schematic view of a fuel delivery system in accordance with the present invention.

Referring to FIG. 1, there illustrated is a fuel delivery system 100, preferably for an aircraft engine, according to the present invention. Upon startup or lightoff an electric pump 108 supplies fuel through a solenoid valve 146 to an inducer/boost pump 116 which in turn supplies fuel to the inlet of the positive displacement pump 118. The solenoid valve 146 and electric pump 108 are controlled by the aircraft pilot.

The positive displacement pump 118, is driven by a shaft 112 which in turn is driven by the engine (not shown). Therefore the amount of fuel delivered is a function of engine speed.

The output of the positive displacement pump 118 is input to a fine screen filter 148 which filters out impurities from the fuel. A portion of the filtered fuel is delivered through line 150 to a servo pressure regulator 123. The servo pressure regulator produces regulated pressure (PR) on line 125 used for positioning the metering valve 124. The regulated pressure is at a higher pressure than the pump interstage pressure (PDF).

The majority of the fuel is delivered via fuel line 122 to a metering valve 124. The metering valve controls the flow of fuel to the engine (not shown) by positioning spool 200 which in turn controls the area of the metering valve window 204.

The position of the spool is maintained by two counter balancing pressures, PR on line 201, and the modulated pressure (PM) input on line 202. The PM on line 202 is controlled by a flapper valve 203 which is positioned by a torque motor 128 in response to a signal from the EEC 106. PM is proportional to PR on line 205 and PDF on line 207.

The EEC 106 determines the position based on the desired engine speed. Feedback on the spool 200 position is provided by an LVDT 126 which is monitored by the EEC 106. The output of the metering valve 124 is delivered to the engine (not shown) on line 130.

The flow through the metering valve is proportional to the area of the metering valve window 204 multiplied by the square root of the product of the pressure differential across the metering valve window 204 and the specific gravity of the fuel. Therefore, in order for the metering valve 124 to precisely control the flow of fuel to the engine by varying the area of the metering window 204 the pressure drop across the metering valve 124 must be held at a desired set point. The pressure drop across the metering valve 124 is controlled by the pressure regulating motive flow control valve (PRMFV)142.

Figure 2:
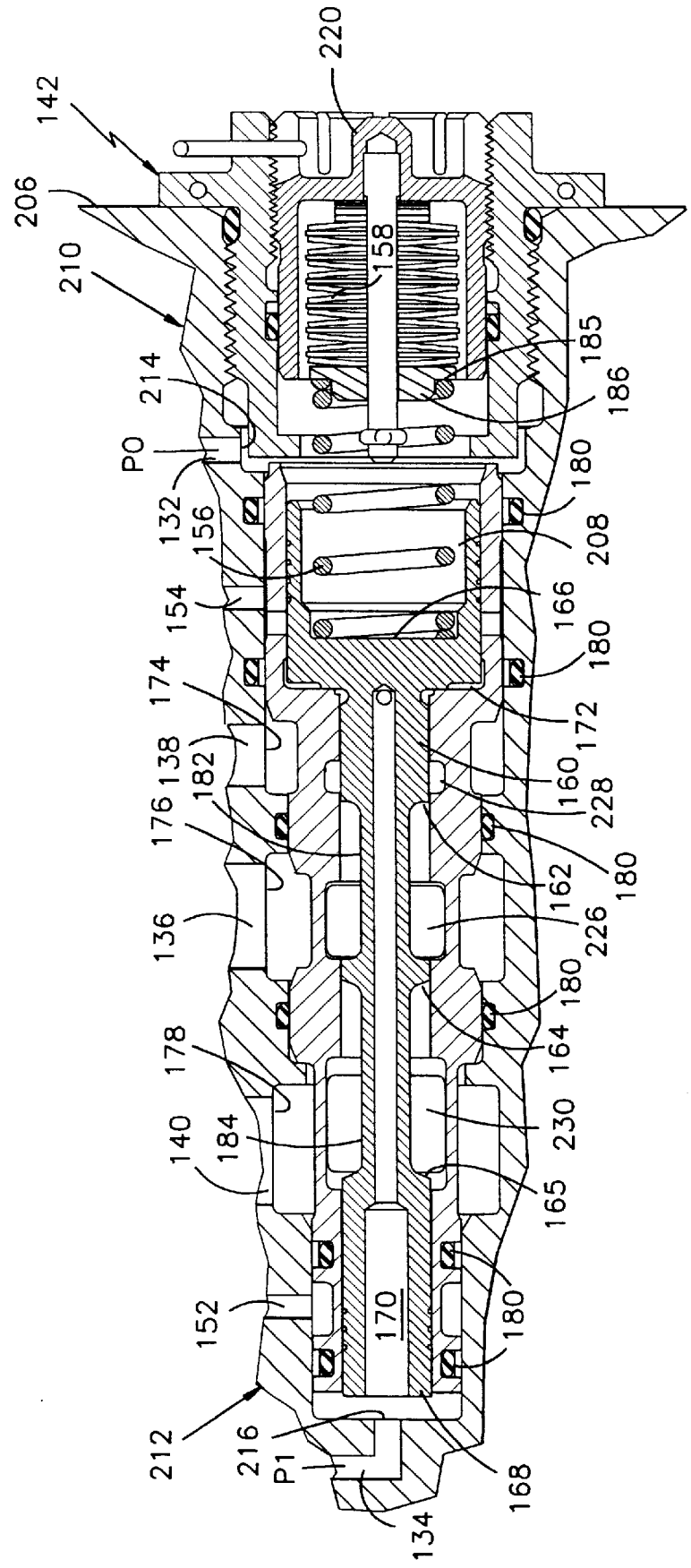
FIG. 2 is a cross sectional view of the combined pressure regulator and motive flow valve in the off position.

The PRMFV 142 is shown in greater detail in FIG. 2. The PRMFV 142 consists of a housing 206 having a first end 210 and second end 212 and having a cavity 208 disposed through its length. Slidably located within the cavity 208 is a spool 160 having a low pressure end 166 and high pressure end 168.

Located at the first end 210 of the housing 206 is a port 214 for sensing the metered pressure (P0) of the metered flow on line 132. Located at a second end 212 of the housing is a port 216 for sensing pressure (P1) of the positive displacement pump output flow on line 134. O-ring seals 180 provides a seal between the housing 206 and the spool 160 to prevent the metered fuel received on line 132 from communicating with the remainder of the cavity 208. Thus constrained the positive displacement pump output pressure (P1) acts upon the high pressure end 168 and annular chamber 172 of spool 160.

A drilled passage 170 extends through a portion of spool 160 to the annular chamber 172 placing high pressure end 168 in fluid communication with annular chamber 172. Drilled passage 170 allows for a reduction in the diameter of the valve by relocating the portion of the spool 160 upon which P1 acts. Therefore P1 acts upon a portion of the spool 160 equal to that acted upon by P0. P0 acts upon the low pressure end 166 in conjunction with spring 156 and bimetallic discs 158 to position the spool 160 within housing 206.

Spring 156 is located within cavity 208 at a first end 166 of spool 160. The spring 156 sets the pressure differential to be maintained across the metering valve 124. The spring 156 has sufficient force to hold the spool 160 in a closed position, upon startup or lightoff of the engine. The spring 156 is located relative to the housing by spring seat 186.

Bimetallic discs 158 are also located between an end 185 of spring 156 and a housing end cap 220. The bimetallic discs expand as the temperature of the fuel increases thus increasing the pressure differential setting across the metering valve. This expansion is needed for this temperature change because the flow through the metering window 204 of valve 124 is proportional to the area of the metering window 204 multiplied by the square root of the product of the pressure drop across the metering window 204 multiplied by the specific gravity of the fuel. The specific gravity of the fuel decreases as the temperature of the fuel increases. Therefore the pressure differential must be increased for decreases in specific gravity in order to have the expected fuel flow for a given metering window 204 area.

There are three ports located along the length of the housing 206 that are in fluid communication with the cavity 208. The first port 176 receives flow from the output of the positive displacement pump 118 along line 136 and is connected to cavity 208 through first window 226. The second port 174 is an output for providing bypass flow to the ejector pump 110 along line 138 and is connected to cavity 208 through second window 228. The third port 178 is an output for providing bypass flow to the input of the positive displacement pump 118 along line 140 and is connected to cavity 208 through third window 230.

The spool 160 has a first land 162, a second land 164, and a third land 165. A first recess 182 separates the first 162 and second 164 lands, and a second recess 184 separates the second 164 and third 165 lands, with the second land 164 being disposed between the first 162 and third 165 lands.

Lines 152 and 154 provide filtered fuel 150, to cleanse the small diametral clearances of the PRMFV 142.

FIG. 2 also shows the PRMFV 142 in a first, closed position. In this position the force exerted by P1 through line 134 on the high pressure end 168 of the spool 160 is less than the combined force of the spring 156, bimetallic discs 158, and P0 exerted on the low pressure end 166 of the spool 160. In this position the first land 162 is disposed between the first window 226 and the second window 228 preventing bypass flow to the ejector pump 110 through line 138. The second land 164 is positioned between the first window 226 and the third window 230 preventing bypass flow to the input of the positive displacement pump 118 through line 140.

Figure 3:
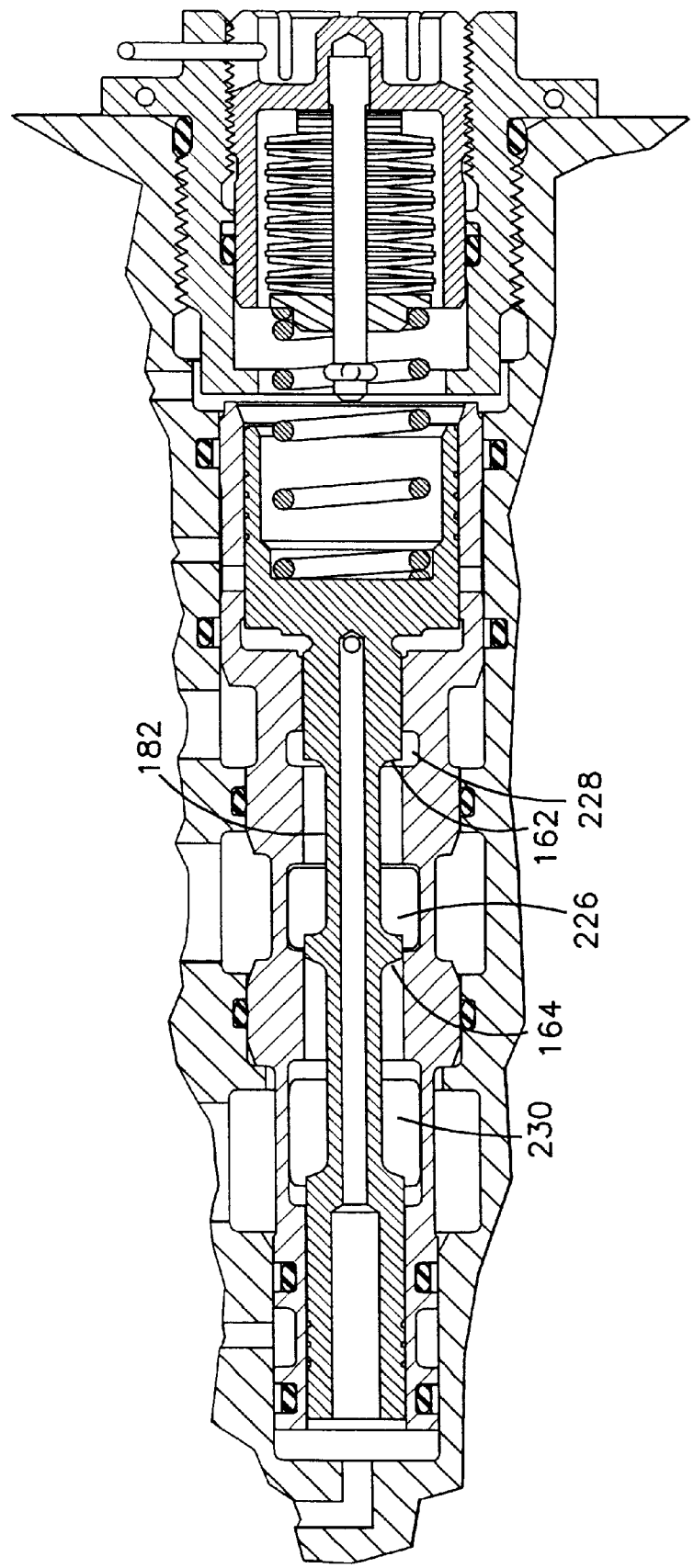
FIG. 3 is a cross sectional view of the combined pressure regulator and motive flow valve as shown in FIG. 2 with the ejector bypass loop open.

As the speed of the positive displacement pump 118 increases, the pressure P1 increases such that it is greater than P0, spring 156 and bimetallic discs 158 causing the spool 160 to transition to the right as shown in FIG. 3. The first land 162 is now positioned such that first window 226 is now in fluid communication with second window 228 through first recess 182 allowing bypass flow to the ejector pump 110. As the fuel is bypassed the pressure differential will return to the desired set point. Second land 164 remains positioned between first window 226 and third window 230 preventing bypass flow to the inlet of the positive displacement pump 118.

Figure 4:
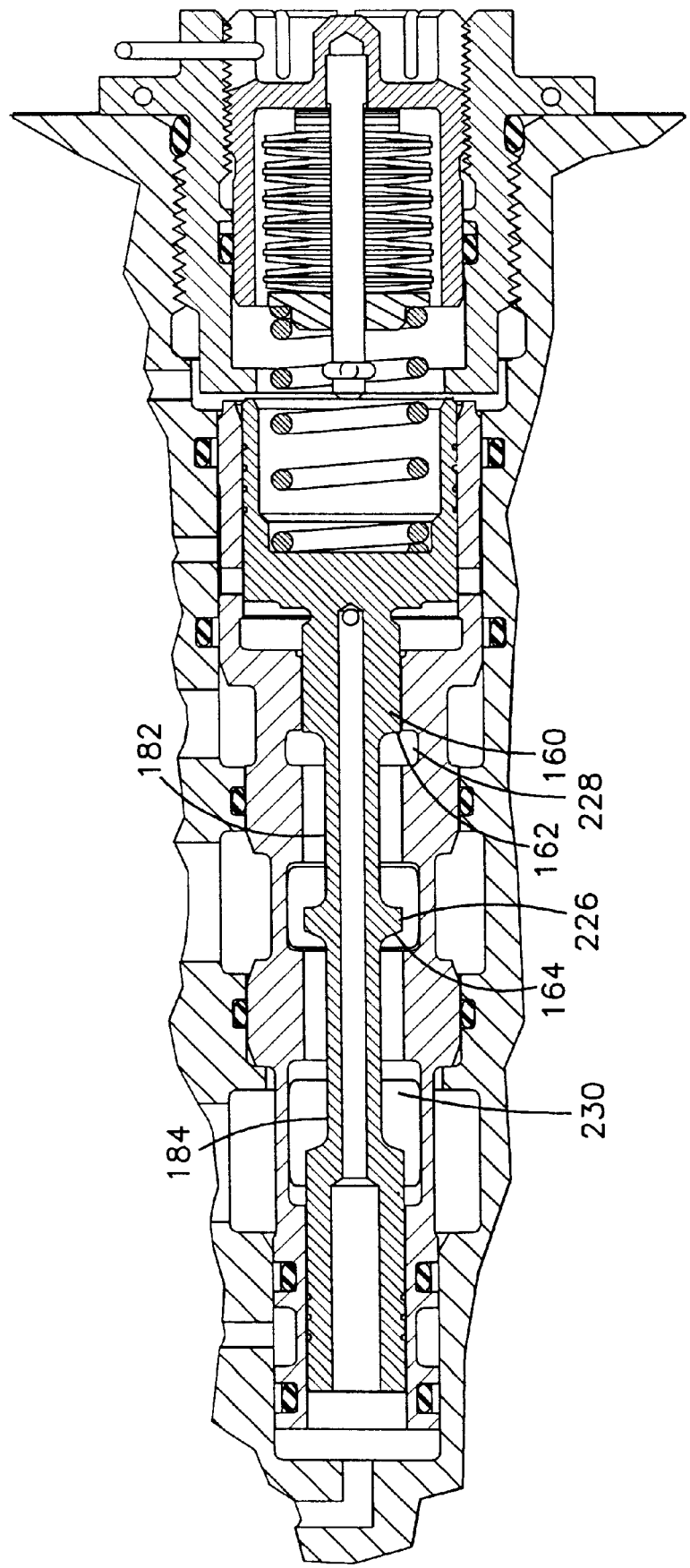
FIG. 4 is a cross sectional view of the combined pressure regulator and motive flow valve as shown in FIG. 2 with the ejector bypass loop and positive displacement bypass loop open.

As the speed of the positive displacement pump 118 increases still further, the pressure P1 increases such that it is greater than P0 causing the spool 160 to transition further to the right as shown in FIG. 4. The first land 162 is now positioned such that first window 226 is now in fluid communication with second window 228 through first recess 182 allowing greater bypass flow to the ejector pump 110. Second land 164 is now positioned in first window 226 such that first window 226 is now in fluid communication with third window 230 through second recess 184 allowing bypass flow to both the inlet of the positive displacement pump 118 and the ejector pump 110. As the fuel is bypassed the pressure differential will return to the desired set point.

As the speed of the positive displacement pump 118 decreases the process described in the preceding paragraphs is reversed.

It should be understood by those skilled in the art that obvious structural modifications can be made without departing from the spirit of the invention. Accordingly, reference should be made primarily to the accompanying claims, rather than the foregoing specification, to determine the scope of the invention.

I claim:

1. A fuel delivery system for providing a desired fuel flow to an engine, comprising:
    a first pump means for providing fuel;
    a metering means for providing the desired fuel flow to the engine, said metering means in fluid communication with said first pump means for receiving said fuel; and
    a pressure regulation means for setting a pressure differential across said metering means as required by the desired fuel flow, said pressure regulation means including a means for sensing said pressure differential, wherein said pressure regulation means includes a first means for bypassing said fuel away from said metering means for adjusting said pressure differential as required to achieve said desired fuel flow and a second means for bypassing said fuel away from said metering means for further adjusting said pressure differential as further required to achieve the desired fuel flow.

2. The fuel delivery system of claim 1 wherein said first pump means is a fixed displacement pump.

3. The fuel delivery system of claim 1 wherein said first bypass means is in fluid communication with a second pump means for providing said fuel to said second pump means.

4. The fuel delivery system of claim 3, wherein said second pump means is an ejector pump.

5. The fuel delivery system of claim 1 wherein said second bypass means is in fluid communication with said first pump means for providing said fuel to said first pump means.

6. The fuel delivery system of claim 1 wherein said pressure regulation means comprises:
    a biasing means for setting said differential pressure to be maintained across said metering means.

7. The fuel delivery system of claim 6 wherein said biasing means further comprises a spring.

8. The fuel delivery system of claim 1 wherein said pressure regulation means further comprises:
    a temperature compensation means for increasing said differential pressure as a temperature of said fuel flow increases.

9. The fuel delivery system of claim 8 wherein said temperature compensation means further comprises:
    a bimetallic disc for expanding as said temperature increases.

10. A fuel delivery system for providing a desired fuel flow to an engine, comprising:
    a first pump means for providing fuel;
    a metering means for providing the desired fuel flow to the engine, said metering means in fluid communication with said first pump means for receiving said fuel; and
    a combined pressure regulating and motive flow valve for setting a pressure differential across said metering means as required by the desired fuel flow, comprising:
        a spool valve having a first end in fluid communication with said pump means for sensing a first pressure of said fuel and a second end in fluid communication with said metering means for sensing a second pressure of the desired flow;
        a first port in fluid communication with said pump means for receiving said fuel;
        a second port in fluid communication with a first bypass line; and,
        a third port in fluid communication with a second bypass line, wherein said spool valve is in a first position upon engine startup for isolating said second and third ports from said first port, wherein as a flow of said fuel increases, said spool valve transitions placing said first port in fluid communication with said second port bypassing a first portion of said fuel through said first bypass line for adjusting said differential pressure and wherein as said flow of said fuel further increases said spool valve transitions placing said first port in fluid communication with said second port bypassing a first portion of said fuel through said first bypass line and placing said first port in fluid communication with said third port bypassing a second portion of said fuel through said second bypass line for adjusting said differential pressure.

11. The fuel delivery system of claim 10 wherein said first bypass line is in fluid communication with a second pump means for providing said first portion to said second pump means.

12. The fuel delivery system of claim 11 wherein said second pump means comprises an ejector pump.

13. The fuel delivery system of claim 10 wherein said second bypass loop is in fluid communication with said first pump means for providing said second portion to said first pump means.

14. The fuel delivery system of claim 10 wherein said combined pressure regulating and motive flow valve comprises:
    a biasing means for setting said pressure differential across said metering means.

15. The fuel delivery system of claim 14 wherein said biasing means further comprises a spring.

16. The fuel delivery system of claim 10 wherein said combined pressure regulating and motive flow valve further comprises:
    a temperature compensation means for increasing said pressure differential as a temperature of said fuel increases.

17. The fuel delivery system of claim 16 wherein said temperature compensation means further comprises:
    a bimetallic disc for expanding as said temperature increases.

18. A method of providing a desired fuel flow to an engine comprising:
    pressurizing fuel with a first pump means;

regulating the fuel by a metering means to provide the desired fuel flow to the engine wherein said metering means is in fluid communication with said pump means for receiving said fuel;

setting a pressure differential across said metering means as required by the desired fuel flow by a pressure regulation means, including a means for sensing said pressure differential and, wherein said pressure regulation means bypasses said fuel away from said metering means for adjusting said pressure differential as required to achieve the desired fuel flow and a second means for bypassing said fuel away from said metering means for further adjusting said pressure differential to achieve the desired fuel flow.

19. The method of controlling fuel delivery of claim 18 wherein said fuel is bypassed to a second pumping means for providing said fuel to said first pumping means.

* * * * *